United States Patent
Snyder et al.

(10) Patent No.: US 10,066,836 B2
(45) Date of Patent: Sep. 4, 2018

(54) GAS TURBINE ENGINE SYSTEMS AND METHODS INVOLVING ENHANCED FUEL DISPERSION

(71) Applicant: United Technologies Corporation, Hartford, CT (US)

(72) Inventors: Timothy S. Snyder, Glastonbury, CT (US); Steven W. Burd, Cheshire, CT (US); Randal G. McKinney, Tolland, CT (US); George F. Titterton, III, Hebron, CT (US)

(73) Assignee: United Technologies Corporation, Farmington, CT (US)

( * ) Notice: Subject to any disclaimer, the term of this patent is extended or adjusted under 35 U.S.C. 154(b) by 12 days.

(21) Appl. No.: 14/800,762

(22) Filed: Jul. 16, 2015

(65) Prior Publication Data

US 2015/0316000 A1 Nov. 5, 2015

Related U.S. Application Data

(63) Continuation of application No. 12/204,272, filed on Sep. 4, 2008, now Pat. No. 9,115,897.

(51) Int. Cl.

| | |
|---|---|
| *F23R 3/20* | (2006.01) |
| *F02K 3/10* | (2006.01) |
| *F02C 7/236* | (2006.01) |
| *F02C 7/22* | (2006.01) |
| *F01D 25/30* | (2006.01) |
| *F02K 1/82* | (2006.01) |
| *F23R 3/28* | (2006.01) |

(52) U.S. Cl.
CPC .............. *F23R 3/20* (2013.01); *F01D 25/305* (2013.01); *F02C 7/22* (2013.01); *F02C 7/2365* (2013.01); *F02K 1/822* (2013.01); *F02K 3/10* (2013.01); *F23R 3/28* (2013.01); *F05D 2240/36* (2013.01); *F05D 2260/202* (2013.01); *F05D 2260/30* (2013.01); *F23D 2207/00* (2013.01)

(58) Field of Classification Search
CPC .......... F23R 3/20; F23R 3/28; F23D 2207/00; F02C 7/2365; F02K 3/10
See application file for complete search history.

(56) References Cited

U.S. PATENT DOCUMENTS

| | | |
|---|---|---|
| 2,780,061 A | 2/1957 | Clarke et al. |
| 2,799,991 A | 7/1957 | Conrad |
| 2,851,859 A | 9/1958 | Foure |
| 3,531,937 A | 10/1970 | Sneeden |

(Continued)

OTHER PUBLICATIONS

The American Heritage Dictionary, Second College Edition, Houghton Mifflin Company, 1976, p. 145, 484, 1282.*

(Continued)

*Primary Examiner* — Lorne Meade

(74) *Attorney, Agent, or Firm* — Carlson, Gaskey & Olds, P.C.

(57) ABSTRACT

Gas turbine engine systems and methods involving enhanced fuel dispersion are provided. In this regard, a representative method for operating a gas turbine engine includes: providing a gas path through the engine; introducing a spray of fuel along the gas path downstream of a turbine of the engine; and impinging the spray of fuel with a relatively higher velocity flow of air such that atomization of the fuel is increased.

8 Claims, 3 Drawing Sheets

(56) References Cited

U.S. PATENT DOCUMENTS

| | | | |
|---|---|---|---|
| 4,730,453 A | 3/1988 | Benoist et al. | |
| 4,798,048 A | 1/1989 | Clements | |
| 4,887,425 A | 12/1989 | Vdoviak | |
| 5,117,628 A | 6/1992 | Koshoffer | |
| 5,163,284 A | 11/1992 | Shekleton | |
| 5,220,794 A | 6/1993 | Sledd et al. | |
| 5,233,825 A | 8/1993 | Shekleton | |
| 5,277,022 A | 1/1994 | Shekleton et al. | |
| 5,297,391 A | 5/1994 | Roche | |
| 5,317,864 A | 6/1994 | Shorb et al. | |
| 5,367,873 A | 11/1994 | Barcza et al. | |
| 5,385,015 A | 1/1995 | Clements et al. | |
| 5,396,761 A | 3/1995 | Woltmann et al. | |
| 5,400,589 A | 3/1995 | Mahias et al. | |
| 5,685,140 A | 11/1997 | Clements et al. | |
| 5,685,142 A | 11/1997 | Brewer et al. | |
| 6,895,756 B2 | 5/2005 | Schmotolocha et al. | |
| 6,907,724 B2 | 6/2005 | Edelman et al. | |
| 6,971,239 B2 | 12/2005 | Snyder et al. | |
| 9,115,897 B2 * | 8/2015 | Snyder | F23R 3/20 |

OTHER PUBLICATIONS

Lefebvre, A.H., Gas Turbine Combustion, Second Edition, Taylor & Francis, Philadelphia, 1998. pp. 286-287.*

* cited by examiner

GAS TURBINE ENGINE SYSTEMS AND METHODS INVOLVING ENHANCED FUEL DISPERSION

CROSS-REFERENCE TO RELATED APPLICATION

This application is a continuation of U.S. application Ser. No. 12/204,272, now U.S. Pat. No. 9,115,897, which was filed on Sep. 4, 2008 and is incorporated herein by reference.

TECHNICAL FIELD

The disclosure generally relates to gas turbine engines.

BACKGROUND

Some gas turbine engines incorporate thrust augmentors, which are commonly known as afterburners. Although provided in various configurations, an afterburner generally incorporates a structure for introducing fuel along the gas path of the engine downstream of the turbine section. In some applications, flameholders can be provided for initiating combustion of the additional fuel.

SUMMARY OF THE INVENTION

Gas turbine engine systems and methods involving enhanced fuel dispersion are provided. In this regard, an exemplary embodiment of a gas turbine engine system comprises: a fuel conduit; a nozzle having an outlet, the nozzle being operative to receive a flow of fuel from the fuel conduit and to disperse the fuel from the outlet; and an airflow director positioned, at least partially, about the fuel conduit and being operative to direct a flow of air toward the fuel dispersed from the outlet such that interaction between the flow of air and the fuel dispersed from the outlet further atomizes the fuel.

An exemplary embodiment of a gas turbine engine comprises: a combustion section; and an exhaust section located downstream from the combustion section, the exhaust section having an exhaust case and an augmentor assembly; the augmentor assembly having a nozzle assembly and an airflow director, the nozzle assembly being operative to receive a flow of fuel and to disperse the fuel, the airflow director being operative to direct a flow of air from the exhaust case toward the fuel dispersed from the nozzle assembly such that interaction between the flow of air and the fuel dispersed from the nozzle assembly further disburses the fuel.

An exemplary embodiment of a method for operating a gas turbine engine comprises: providing a gas path through the engine; introducing a spray of fuel along the gas path downstream of a turbine of the engine; and impinging the spray of fuel with a relatively higher velocity flow of air such that atomization of the fuel is increased.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

These and other features of the present invention can be best understood from the following specification and drawings, the following of which is a brief description.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Gas turbine engine systems and methods involving enhanced fuel dispersion are provided, several exemplary embodiments of which will be described in detail. In this regard, pressurized airflows are directed to impinge upon sprays of fuel output from augmentor fuel nozzles. In some embodiments, the airflows are directed from pressurized cavities located within vanes that are positioned across gas paths of the engines. Notably, impingement of the airflows on the fuel can enhance dispersion of the fuel, such as by increasing a degree of atomization.

Figure 1:
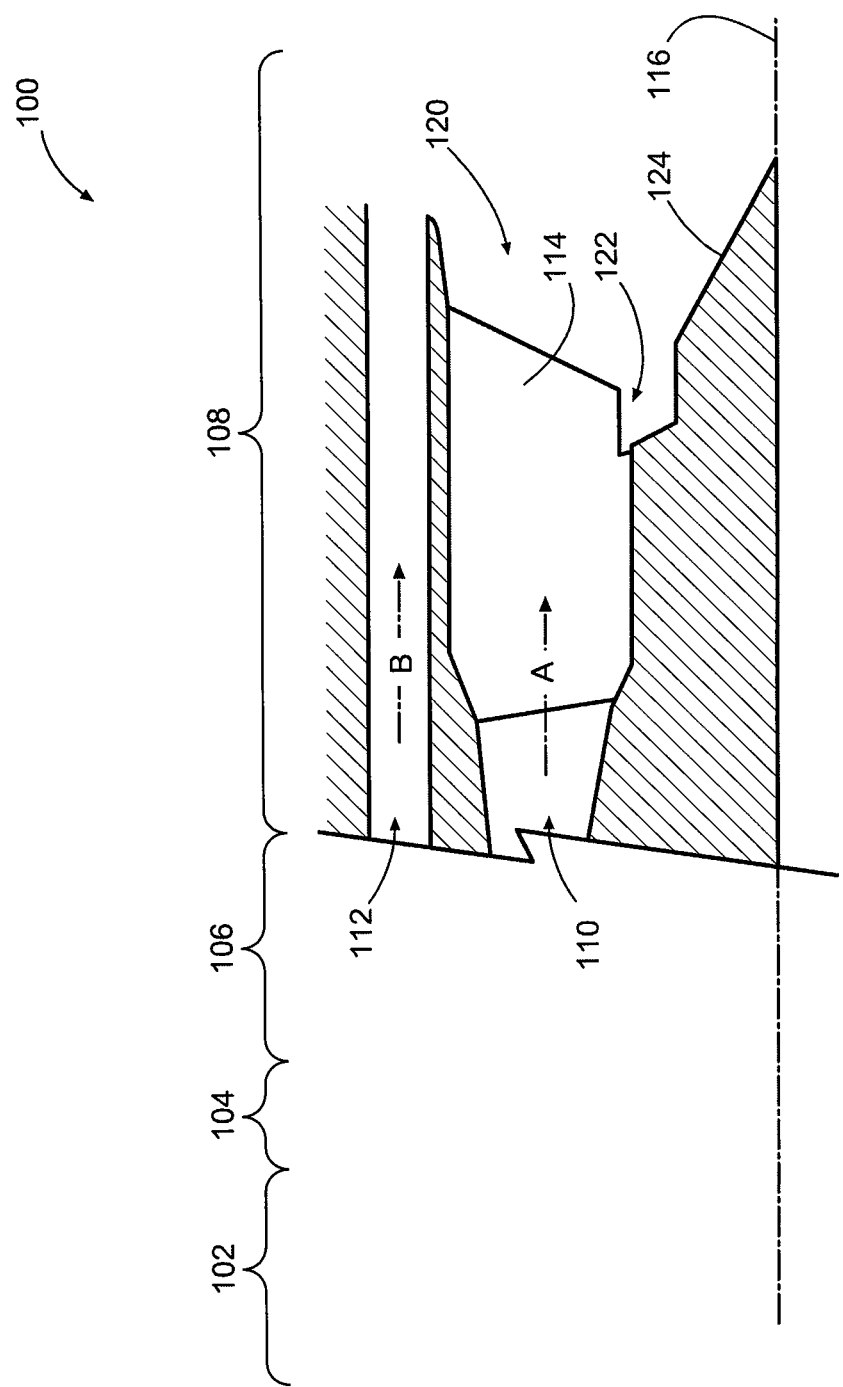
FIG. 1 is a schematic diagram depicting an exemplary embodiment of a gas turbine engine.

Reference is now made to the schematic diagram of FIG. 1, which depicts an exemplary embodiment of a gas turbine engine. Specifically, engine 100 is a turbofan that incorporates a compressor section 102, a combustion section 104, a turbine section 106 and an exhaust section 108. Although depicted as a turbofan gas turbine engine, it should be understood that the concepts described herein are not limited to use with turbojets as the teachings may be applied to other types of gas turbine engines.

As shown in the embodiment of FIG. 1, exhaust section 108 defines a core gas path 110 directing a core flow of gas (depicted by arrow A), and a bypass gas path 112 directing a bypass flow of gas (depicted by arrow B). Multiple vanes (e.g., vane 114) are positioned circumferentially about a longitudinal axis 116 of the engine, with various components of an augmentor assembly 120 being supported by the vanes. By way of example, location 122 of vane 114 (described in greater detail with respect to FIG. 2) mounts a fuel nozzle for providing a spray of fuel for augmentation. Notably, others of the vanes can support corresponding nozzles so that the augmentor assembly comprises an array of nozzles for directing fuel along the gas path 110. A tailcone 124 also is located in the exhaust section.

Figure 2:
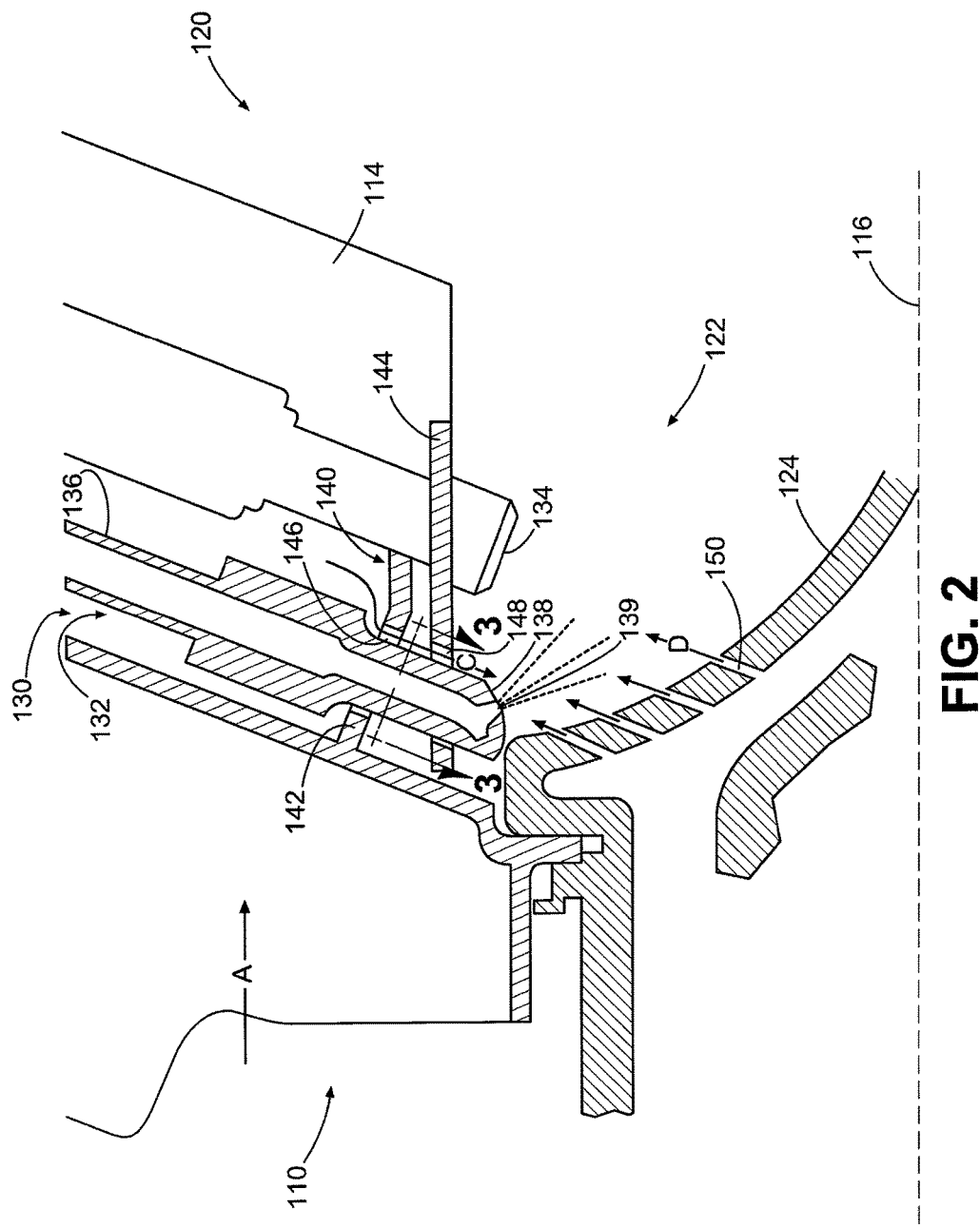
FIG. 2 is a schematic diagram depicting a portion of the embodiment of FIG. 1.

As shown in FIG. 2, vane 114 includes an internal cavity 130 through which a fuel nozzle assembly 132 and an igniter 134 extend. The igniter 134 is operative to ignite the fuel dispersed from the fuel nozzle assembly. In some embodiments, a single igniter can be used, whereas additional igniters (each of which is typically associated with a corresponding fuel nozzle assembly) can be used in other embodiments.

Fuel nozzle assembly 132 incorporates a fuel conduit 136, a fuel nozzle 138 and a mounting assembly 140. Fuel conduit 136 delivers a flow of fuel to a fuel nozzle 138. Fuel nozzle 138 is positioned to direct a spray of fuel (depicted by dashed lines) from an outlet 139 to gas path 110. Positioning of the fuel nozzle 138 is facilitated by the mounting assembly 140.

In the embodiment of FIG. 2, mounting assembly 140 includes two mounting components 142, 144, each of which incorporates an aperture. Specifically, component 142 includes aperture 146, and component 144 includes aperture 148. In this embodiment, the components are configured as mounting brackets that removably mount the fuel conduit within the cavity. The apertures are sized and shaped to accommodate passage of the fuel conduit.

Additionally, one or more gaps formed between an exterior of the fuel conduit and the surfaces defining the apertures 146, 148 function as an airflow director. Since the cavity 130 is pressurized during operation, the airflow director directs a flow of air (depicted by arrow C) toward the fuel dispersed from the nozzle outlet 139. Notably, interaction between the flow of air and the fuel dispersed from the outlet further disperses (e.g., atomizes) the fuel. In this embodiment, the flow of air from the airflow director is generally directed radially inwardly toward a centerline of the engine.

Source pressure for the airflow is higher than that of gas path 110 and, in this embodiment, is provided from bypass flow 112 (FIG. 1). Typical pressure ratios between the airflows of paths 110 and 112 can vary considerably during operation. By way of example, a range of such pressure ratios (pressure of path 112/pressure of path 110) may be between approximately 1.12 to approximately 1.40.

It should be noted that the flow of air provided by the airflow director exhibits a relatively higher velocity than other air flowing in a vicinity of the spray of fuel. In this regard, the embodiment of FIG. 2 provides flows of cooling air for cooling tailcone 124. Specifically, tailcone 124 incorporates cooling holes (e.g., hole 150) through which cooling air (depicted by arrow D, for example) flows. The cooling air from tailcone 124 in this embodiment provides a sufficient film of air to cool the tailcone while not being of high enough velocity to divert fuel spray 138 away from igniter 134.

Various influences may affect the flow velocity and volume of airflow provided by the airflow director. Notably, some of these influences include the size and shape of the one or more apertures of the mounting assembly. In this regard, reference is made to FIG. 3, which depicts a portion of mounting component 144.

Figure 3:
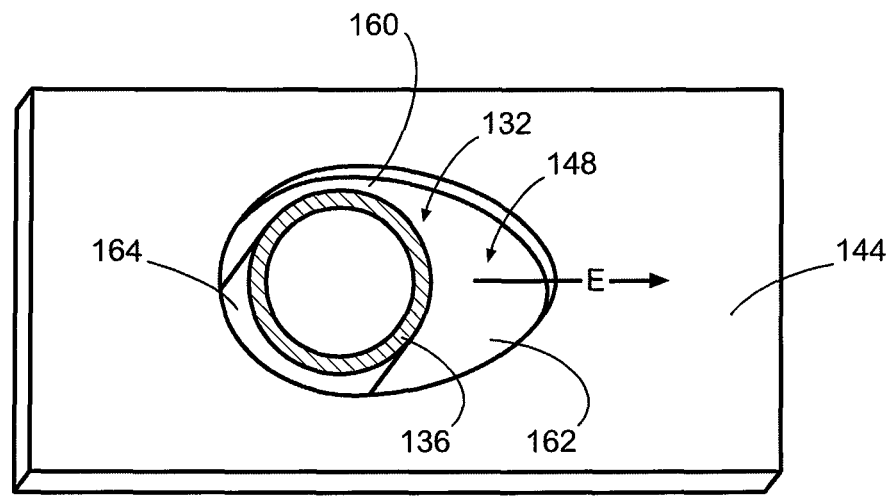
FIG. 3 is a schematic diagram depicting a portion of the nozzle assembly of the embodiment of FIGS. 1 and 2 as viewed along section line 3-3.

As shown in FIG. 3, aperture 148 of mounting component 144 provides a continuous, annular gap 160 about the exterior of nozzle assembly 132. However, in this embodiment, a portion 162 of the gap is larger than a portion 164 of the gap, which is located on the opposing side of the fuel conduit. Specifically, portion 162 of the gap is positioned along a portion of the fuel conduit corresponding to a direction (indicated generally by arrow E) at which the fuel is dispersed from the nozzle. Notably, gap 160 is sized to assist in atomizing fuel (e.g., fuel spray 138) while preventing the velocity of the air through the gap from being too high, which can cause fuel to be diverted from an associated igniter.

In order to achieve the desired gap about the nozzle assembly (e.g., about the fuel conduit), various techniques can be used. By way of example, tolerances used to form one or more of the various components can be established to ensure that the desired spacing is achieved. Additionally or alternatively, another component (e.g., a spacer) can be used to position the nozzle assembly with an aperture.

Figure 4:
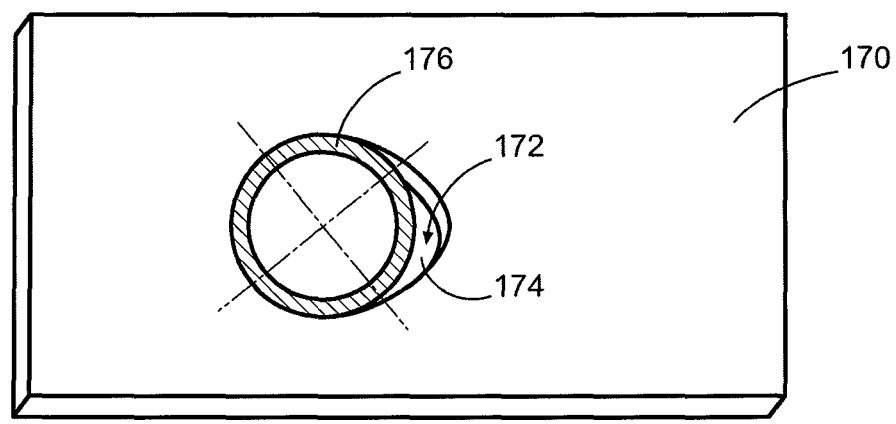
FIG. 4 is a schematic diagram depicting a portion of another exemplary embodiment of a nozzle assembly.

FIG. 4 is a schematic diagram depicting a portion of another exemplary embodiment of a nozzle assembly. As shown in FIG. 4, mounting component 170 includes an aperture 172, which provides a gap 174 about a portion of the exterior of a fuel conduit 176. In this embodiment, the gap extends circumferentially about the fuel conduit up to approximately 90 degrees. In other embodiments, such a gap can extend circumferentially about a portion of a nozzle assembly up to approximately 180 degrees, whereas still others may extend up to approximately 45 degrees.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A gas turbine engine comprising:
   a combustion section;
   an exhaust section located downstream from the combustion section, the exhaust section having an exhaust case and an augmentor assembly;
   the augmentor assembly having a nozzle and an airflow director, the nozzle being configured to receive fuel in a flow of fuel and to disperse the fuel, the airflow director being configured to direct a flow of air from the exhaust case toward the fuel dispersed from the nozzle such that interaction between the flow of air and the fuel dispersed from the nozzle further disperses the fuel;
   the augmentor assembly further including a first mounting component configured to position a fuel conduit with respect to a vane, a second mounting component configured to position the fuel conduit with respect to the vane, and an igniter extending through the first mounting component and contacting the second mounting component, the first and second mounting components defining the airflow director, wherein the airflow director includes a first aperture through which the fuel conduit is mounted and a first airflow gap defined between the fuel conduit and the mounting component at the first aperture and a second aperture through which the fuel conduit is mounted and a second airflow gap defined between the fuel conduit and the mounting component; and
   wherein the nozzle is directed toward the igniter such that fuel is dispersed toward the igniter from the nozzle.

2. The engine of claim 1, wherein the airflow director is positioned, at least partially, about the nozzle.

3. The engine of claim 1, further comprising cooling air apertures operative to direct cooling air toward a vicinity of the nozzle.

4. The engine of claim 3, wherein the exhaust section has a tail cone; and the air cooling apertures are located on the tail cone.

5. The engine of claim 1, wherein the vane extends across a gas path of the exhaust section, the nozzle being routed through at least a portion of the vane.

6. The engine of claim 1, wherein the engine is a turbofan gas turbine engine.

7. The engine of claim 1, wherein airflow through the aperture is aligned with a direction of the flow of fuel at the aperture.

8. The engine of claim 1, wherein fuel between said nozzle and an intersection of the flow of air and the fuel has a first magnitude of disbursement, and fuel downstream of the intersection between the flow of air and the fuel has a second disbursement, the second disbursement being greater than the first disbursement.

* * * * *